United States Patent
Tanghe

[19]

[11] Patent Number: 6,040,954
[45] Date of Patent: Mar. 21, 2000

[54] HIGH SPEED WRITE DRIVER FOR MAGNETIC INDUCTIVE WRITE HEAD USING A HALF-SWITCHED H-DRIVER

[75] Inventor: Steven J. Tanghe, Essex Junction, Vt.

[73] Assignee: International Business Machines Corporation, Armonk, N.Y.

[21] Appl. No.: 08/837,410

[22] Filed: Apr. 17, 1997

[51] Int. Cl.[7] ....................................................... G11B 5/02
[52] U.S. Cl. ................................ 360/68; 360/46; 360/67; 327/423
[58] Field of Search ..................................... 327/110, 423, 327/427, 482; 360/46, 67, 68; 365/149; 369/13

[56] References Cited

U.S. PATENT DOCUMENTS

| | | |
|---|---|---|
| 4,551,772 | 11/1985 | Sliger ........................................ 360/46 |
| 5,287,231 | 2/1994 | Shier et al. . |
| 5,291,069 | 3/1994 | Gooding et al. . |
| 5,291,347 | 3/1994 | Ngo . |
| 5,296,975 | 3/1994 | Contreras et al. ........................ 360/46 |
| 5,333,081 | 7/1994 | Mitsui . |
| 5,386,328 | 1/1995 | Chiou et al. . |
| 5,532,631 | 7/1996 | Ngo et al. . |
| 5,559,763 | 9/1996 | Ishii . |
| 5,822,141 | 10/1998 | Chung et al. ............................. 360/46 |

*Primary Examiner*—Aristotelis M. Psitos
*Assistant Examiner*—Dan I. Davidson
*Attorney, Agent, or Firm*—Whitham, Curtis & Whitham; Eugene I. Shkurko

[57] ABSTRACT

A write driver in an H configuration for magnetic inductive write heads characterized by having both arms in the bottom half of the driver conduct current all the time, with only the top devices being switched. In this configuration there is no need to synchronize the switching of the top and bottom halves of the H-driver. Furthermore, the device half being switched can be optimized for speed independent of the properties of the other H-driver half.

7 Claims, 4 Drawing Sheets

6,040,954

HIGH SPEED WRITE DRIVER FOR MAGNETIC INDUCTIVE WRITE HEAD USING A HALF-SWITCHED H-DRIVER

BACKGROUND OF THE INVENTION

1. Field of the Invention

The present invention generally relates to the field of write drivers for operating inductive recording heads. In particular it relates to a technique for increasing the speed of write drivers which use an H configuration.

2. Background Description

A disk drive has inductive write heads that write information to the disk when current is switched through them. The switching current creates a magnetic field that is recorded on the disk medium. It is desirable to switch the head current from a positive value to a negative value (and vice versa) very fast so that data bits can be packed closer together on the disk for a given rotational speed. This leads to a higher density on the disk and allows a high data transfer rate.

At one time conventional write drivers consisted of resistively-loaded emitter-coupled pairs of bipolar transistors. The transistors served to switch a constant current through the write head, which was connected between the collectors. By alternatively turning on the switches, bidirectional current pulses were generated in the head. This approach was not particularly fast and dissipated a substantial amount of power because the circuit required twice the amount of current that was delivered to the head.

In more recent times, it has become standard to switch current in the write head using four transistor switches in an H configuration. This traditional circuit for switching the current in the write head is called an H-driver because the circuit, schematically, is shaped like an "H." The usual H-driver configuration includes upper write switching or "pull-up" transistors and lower "current-switching" transistors. The pull-up transistors are connected between a positive supply voltage and the write head contacts. The current switching transistors are connected between the write head contacts and a constant current sink. Bidirectional current pulses are generated by alternately turning on diagonally opposed switches which steers current in a positive and negative direction through the head. This circuit is faster than the older conventional design and dissipates only half the power.

Two examples of prior art circuits are shown in FIG. 1. The inductive write head is represented with the box called "load." In FIG. 1a the bottom current sources are switched so that the flow of current is either S1-load-S4 or S2-load-S3. Thus, the switching action changes the polarity in the load. FIG. 1b shows a similar arrangement, but the current source itself is not switched; rather, there is a pair of switches that direct which side of the circuit the current flows in.

However, as the state of the art advances there is a need for faster drive circuits which operate with lower supply voltages. These two objectives are in conflict because switching speed through an inductive load is proportional to the voltage swing at the load; furthermore, not all the supply voltage is available to the inductive load because there are voltage drops across the "pull-up" switches, current switches, and current source. Consequently, a variety of techniques have been developed for increasing the voltage swing at the write head load and limiting voltage drops elsewhere in the circuit. For example, in U.S. Pat. No. 5,331,479 to Madsen there is described a capacitive charging circuit for increasing the voltage across the write head. Another capacitive charging circuit is described in U.S. Pat. No. 4,647,988 in connection with a three terminal inductive write head topology. Current mirrors having the effect of reducing voltage drops elsewhere in the H-driver circuit and improving voltage swings across the write head are described in U.S. Pat. No. 5,386,328 to Chiou et al. and in U.S. Pat. No. 5,287,231 to Shier et al.

The present trend in disk drive technologies is to fly the write heads closer to the disk surface for increased coupling efficiency. This, and the fact that head materials and disk platter materials are continuously being improved, has lead to a drop in the inductance of the heads and the write current needed to write data to the disk. Many years ago the inductance of a write head was typically several microhenries whereas now it is typically less than 100 nanohenries. This reduction in inductance, and the increase in switching speed, has lead to a change in the factors that control the current rise time in the head. Older generations of write drivers and heads were mostly limited by the inductance and voltage that could be induced across the head (compliance voltage). The current rise time was proportional to the head inductance divided by the voltage. The switches were able to switch much faster than this and thus their speed did not affect the overall rise time of the current in the head. However, in today's technologies, the switching time of the transistor switches themselves are of the same order of magnitude as the voltage/inductance limited times. The switching times of the devices can actually dominate the overall current switching event. In a traditional H-driver it is imperative that the switching action of both the top and bottom halves of the H-driver occur simultaneously in order to achieve the fastest reversal of current. Any mismatch in the top and bottom switching events leads to longer switching times for the current in the head.

Mismatches may occur because the times required to accomplish the switch are different between the top and bottom halves of the H-circuit. Mismatches may also occur because switching action does not begin at the same time. Process variations tend to aggravate these problems, especially if the top devices are different than the bottom devices and they do not track each other, as is often the case in circuits available from practical manufacturing processes. Even if the switching times are perfectly aligned, in terms of the starting of the transitions, if one of the transitions (either top or bottom) takes longer than the other, the total output current reversal time will be governed by the slowest switching event. These switching events are very difficult to control in practical manufacturing processes with the sub-nanosecond precision required for today's fast drivers.

Various circuits have been used in the prior art to minimize timing mismatches in write head drivers. U.S. Pat. No. 5,333,081 to Mitsui teaches use of a delay circuit which introduces mismatches to avoid overvoltage breakdown, which can actually increase switching time.

SUMMARY OF THE INVENTION

It is therefore an object of the present invention to provide an improvement in H-driver circuitry that results in faster switching times.

It is a further object of the invention to provide an improved H-driver circuitry that can be implemented in practical manufacturing processes.

It is another object of the invention to eliminate timing mismatches between the top and bottom halves of H-driver circuits.

The invention accomplishes these objectives by having the bottom current sources remain on all the time, with only the top devices being switched. In this configuration there is no need to align the top and bottom halves of the H-driver. Furthermore, the device half being switched can be optimized for speed independent of the properties of the other H-driver half.

In certain respects the functionality of this approach runs counter to accepted understanding in the art. In particular, the total current used in the configuration according to the present invention is twice that of an H-driver without the invention. It would therefore be anticipated that higher power dissipation requirements would argue against a practical implementation in modern manufacturing processes, and that higher current and voltage drop across the switches in the upper half of the H-driver would defeat the objective of increasing voltage across the write head to increase transition speed. However, in practical application in high speed write driver circuits these drawbacks are more than compensated for by the speed increases from using the present invention to overcome timing misalignment and mismatch problems.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
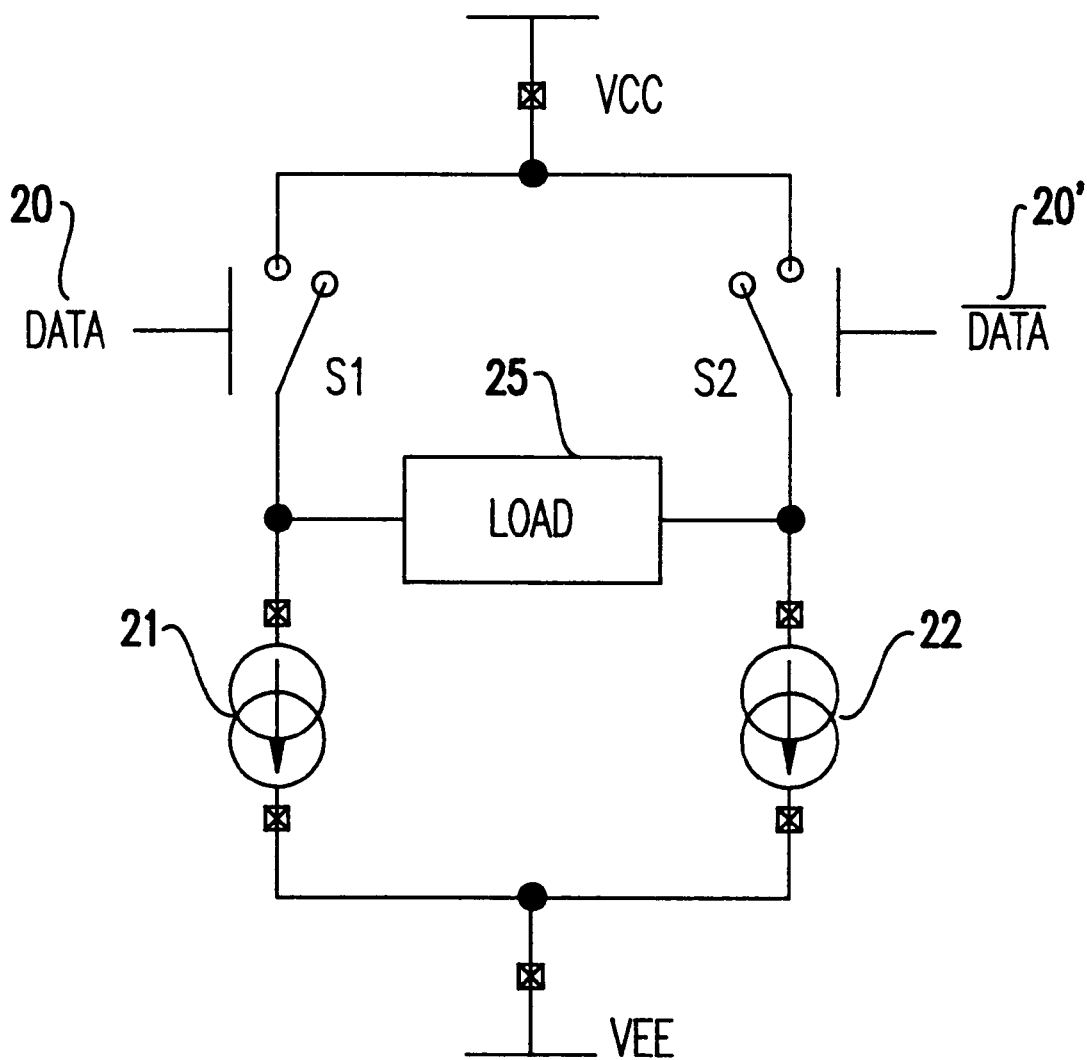
FIG. 2 is a schematic of a half-switched H-driver in accordance with the present invention.

Referring now to the drawings, and more particularly to FIG. 2, there is shown a schematic of a half-switched H-driver in accordance with the present invention. The upper half of the driver is configured in the conventional manner between a supply voltage VCC and a second supply voltage VEE, with switches S1 and S2 being closed when data signal 20 and its inverse 20', respectively and alternatively, are of one polarity (e.g. high) and open when these signals are of the opposite polarity. The data signal alternates between these two polarities, and its output is therefore characterized as binary. In the conventional manner of an H-driver, alternations in the data signal, and respective alternations in closure of switches S1 and S2, cause current to flow through the inductive recording head first in one direction and then the other. In contrast to the prior art, the circuits in the bottom half of the H-driver are closed and are not switched.

Figure 1B:
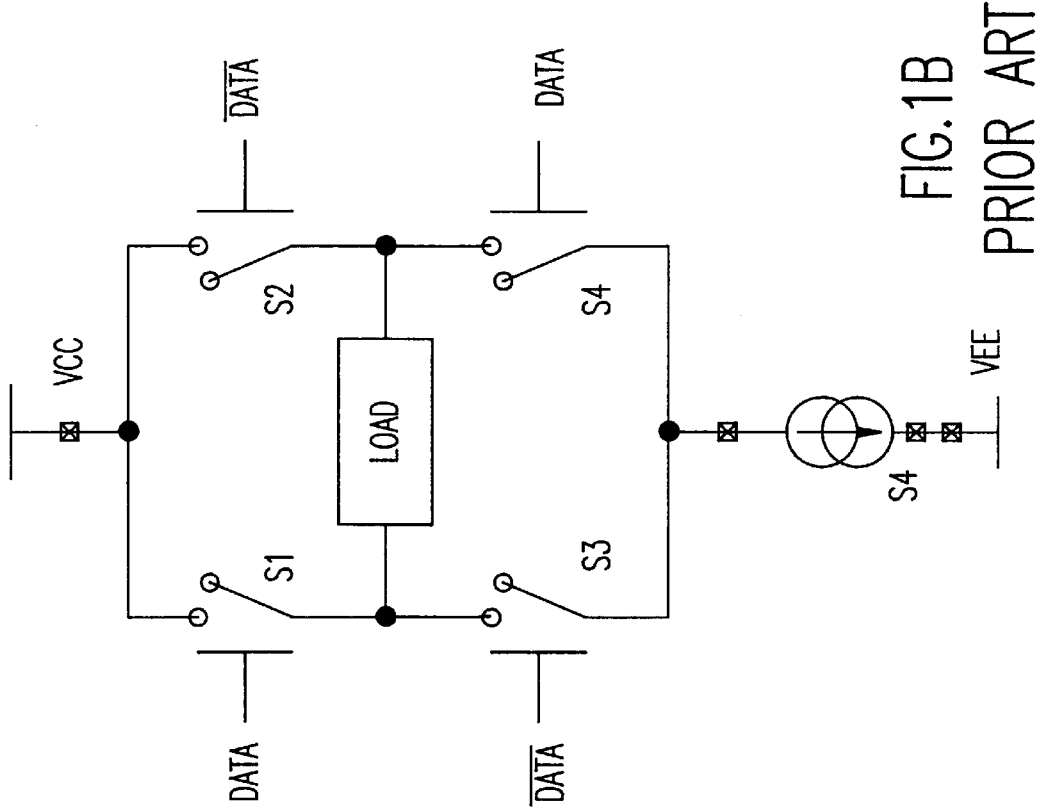
FIGS. 1A and 1B are schematics of H-driver circuits in accordance with the prior art.
Figure 1A:
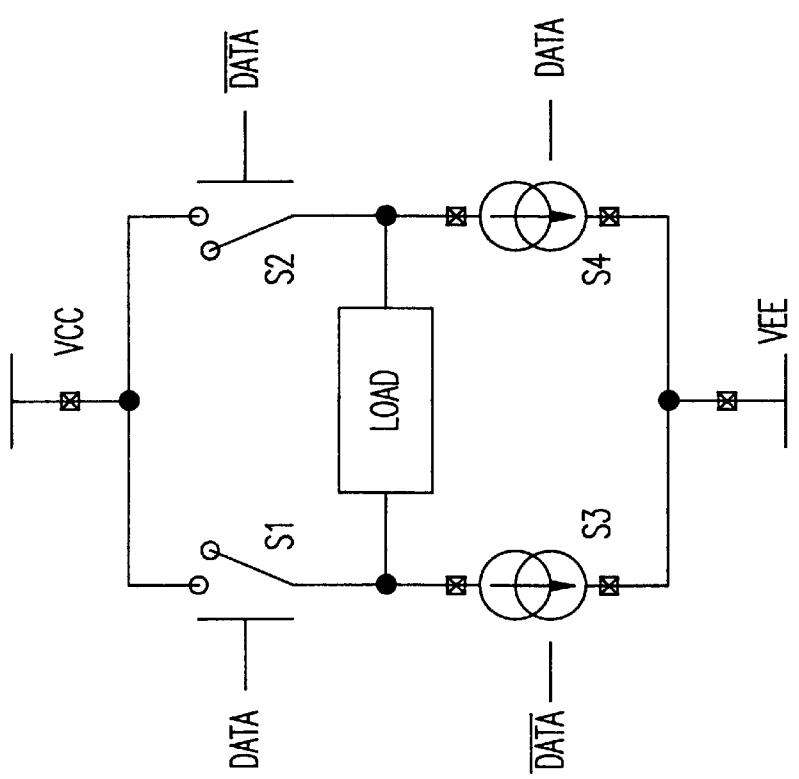
Figure 3:
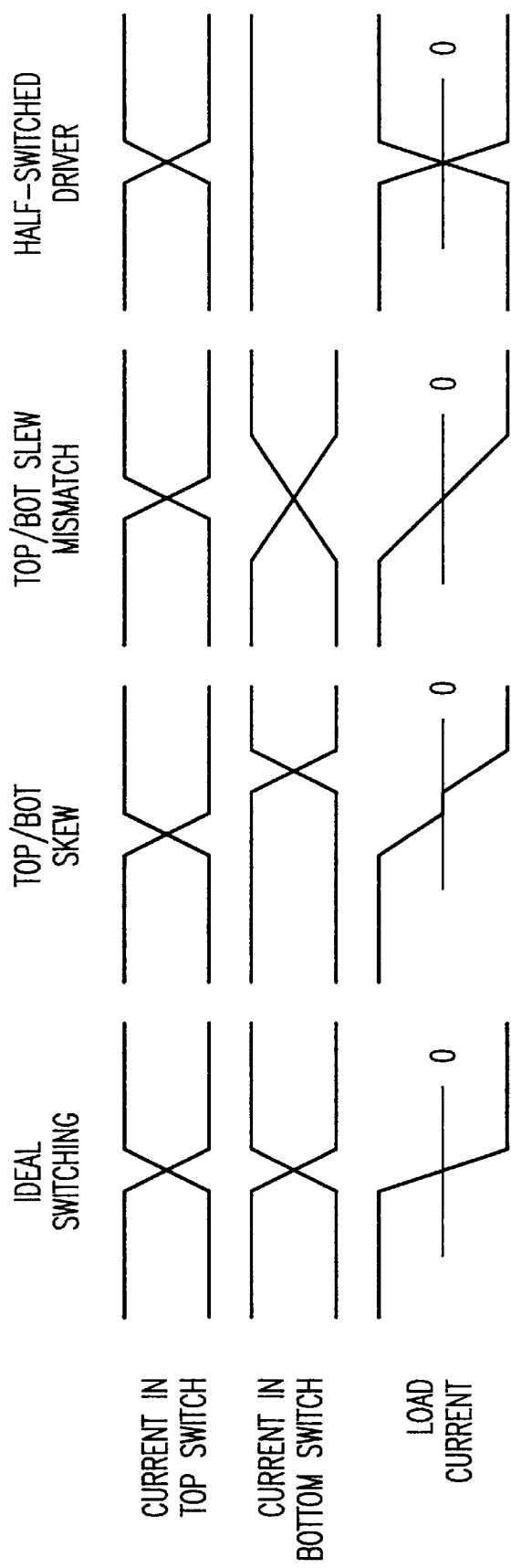
FIGS. 3A through 3D are a set of current waveforms for an H-driver showing timing mismatches remedied by the present invention.

The advantages of this configuration may be understood with reference to FIGS. 3A through 3D. The set of currents shown in FIG. 3A represent the ideal condition in a conventional H-driver when the corresponding top and bottom switches (S1/S4 and S2/S3 as shown in FIGS. 1A and 1B) are synchronized and matched. But as write drivers become faster it is more difficult to synchronize and match switch pairs in practical manufacturing processes. Consequently, it is increasingly likely that switch pairs will be out of alignment (as shown in FIG. 3B) or mismatched (as shown in FIG. 3C).

The present invention eliminates alignment skewing effects entirely (as shown in FIG. 3D). Furthermore, it allows for design and manufacturing optimization of the speed of the top switch without reference to concern for matching the characteristics of another switch, thereby largely reducing the likelihood that switching speed will be determined by a slow switch.

Figure 4:
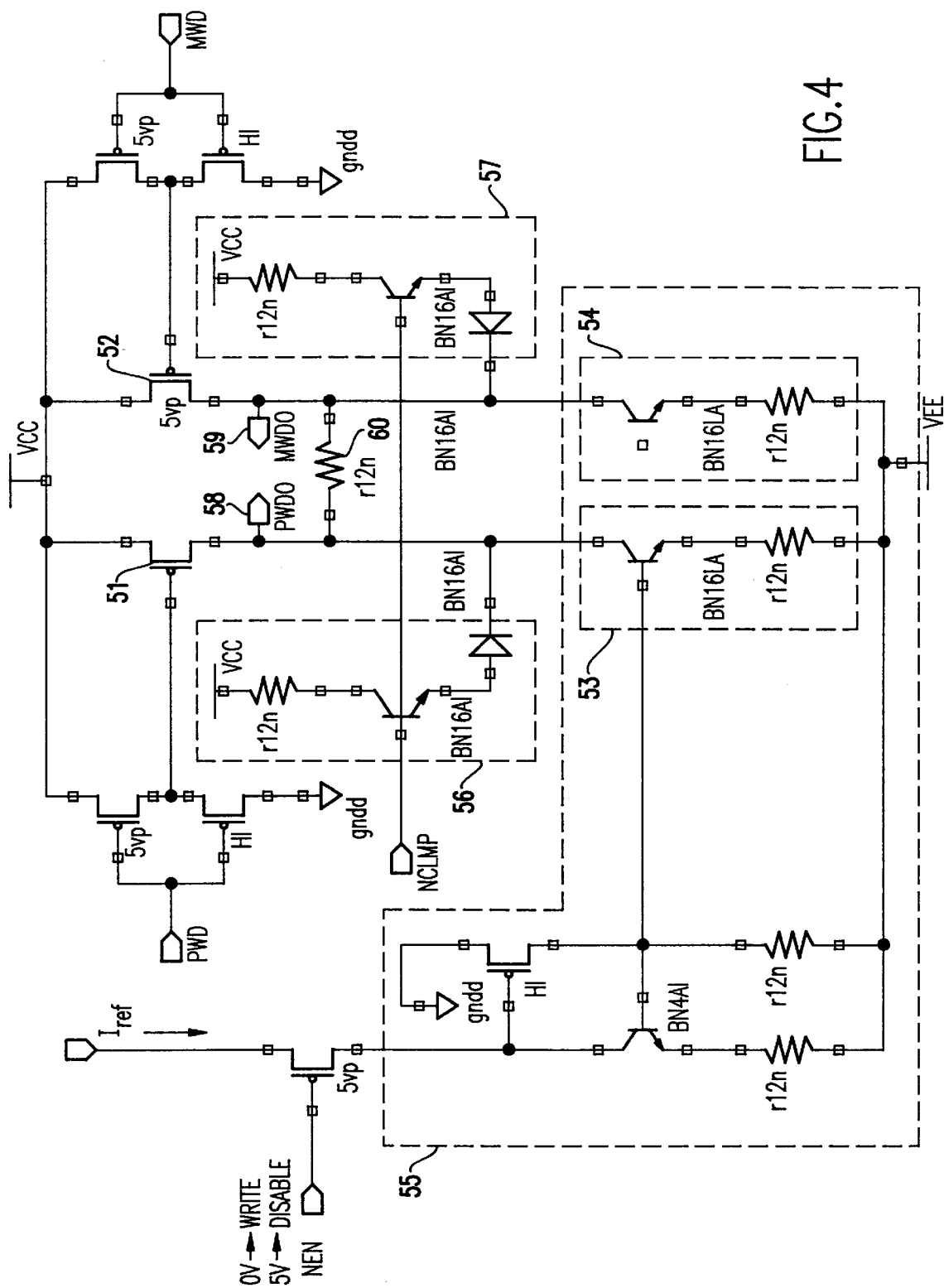
FIG. 4 is a detailed schematic of a circuit implementing the present invention.

A practical implementation of the invention is shown in FIG. 4, to which the discussion now turns. PFET 51 and PFET 52 correspond to switches S1 and S2, respectively, in FIG. 2 and are the switches for the upper half of the H-driver. It should be noted that switches S1 and S2 could also be implemented with NFETs or with bipolar PNP or NPN devices. An inductive write head (not shown) is connected between terminals 58 and 59. Current sources 53 and 54 correspond to current sources 21 and 22, respectively, in FIG. 2. In accordance with the present invention, these bilateral current sources are not switched. Using current technology, they are part of current mirror 55 which multiplies reference current Iref by a factor of about 25. Voltage clamps 56 and 57 serve to keep write head voltage from saturating current sources 53 and 54. Optional damping resistor 60 serves as an added discharge path for the inductive write head.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An H-driver circuit for operating an inductive recording head, said H-driver having a top half and a bottom half, comprising:

means for switching a current bidirectionally through said inductive recording head, responsive to binary alternations in a data signal, from said top half of said H-driver;

means for maintaining current flow bilaterally through said bottom half of said H-driver, wherein increased current flow and voltage drop across said bidirectional switching means is very small and more than offset by an increase in a speed of transition of said bidirectional switching, thereby increasing transition speed of current through said inductive recording head.

2. The circuit of claim 1, wherein said bidirectional switching means comprise first and second switches in said top half of said H-driver, said first switch being closed when said data signal is of a first polarity and said second switch being closed when said data signal is of a second polarity opposite to said first polarity.

3. The circuit of claim 2, wherein said first switch is electrically connected between a supply voltage and said inductive recording head so that when said first switch is closed current flows through said inductive recording head in one direction, and wherein said second switch is electrically connected between said supply voltage and said inductive recording head so that when said second switch is closed current flows through said inductive recording head in a direction opposite to said one direction.

4. The circuit of claim 3, wherein said bilateral maintaining means comprises first and second conducting paths, said first conducting path being connected between a first electrical node and a second supply voltage, said first node being where said first switch is connected to said inductive recording head, and said second conducting path being connected between a second electrical node and said second supply voltage, said second node being where said second switch is connected to said inductive recording head.

5. The circuit of claim 4, wherein said first and second conducting paths are current sources.

6. The circuit of claim 5, wherein said current sources mirror a reference current.

7. A half-switched H-driver circuit for operating an inductive recording head, comprising:

a top half circuit with top half switches whose arms alternatively switch current through said inductive recording head in accordance with alternations in a data signal;

a bottom half circuit whose arms conduct current continuously, wherein increased current flow and voltage drop across said top half switches is very small and more than offset by an increase in a speed of transition of said top half switches, thereby increasing transition speed of current through said inductive recording head.

* * * * *